(12) United States Patent
Hashikami et al.

(10) Patent No.: US 10,432,735 B2
(45) Date of Patent: Oct. 1, 2019

(54) INFORMATION PROCESSING SYSTEM FOR FACILITATING DESIGNATION OF RESTRICTION CONDITIONS IN REQUESTS TO AN INPUT/OUTPUT SERVICE RECEIVED FROM AN INPUT/OUTPUT DEVICE

(71) Applicants: Hidenobu Hashikami, Hiroshima (JP); Masafumi Tokiwa, Kanagawa (JP)

(72) Inventors: Hidenobu Hashikami, Hiroshima (JP); Masafumi Tokiwa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/848,912

(22) Filed: Dec. 20, 2017

(65) Prior Publication Data

US 2018/0183883 A1 Jun. 28, 2018

(30) Foreign Application Priority Data

Dec. 26, 2016 (JP) .................................. 2016-250773
Nov. 30, 2017 (JP) .................................. 2017-230718

(51) Int. Cl.
*H04L 29/08* (2006.01)
*H04N 1/00* (2006.01)
(Continued)

(52) U.S. Cl.
CPC ............ *H04L 67/16* (2013.01); *G06F 3/1239* (2013.01); *H04N 1/0084* (2013.01);
(Continued)

(58) Field of Classification Search
CPC ... H04L 67/16; G06F 3/1239; H04N 1/00225; H04N 1/0084; H04N 1/4426;
(Continued)

(56) References Cited

U.S. PATENT DOCUMENTS

2008/0144099 A1 6/2008 Hagiwara
2010/0050175 A1* 2/2010 Jung .................. H04N 1/00912
718/100

(Continued)

FOREIGN PATENT DOCUMENTS

JP 2008-152499 7/2008

OTHER PUBLICATIONS

Extended European Search Report for 17209909.5 dated May 14, 2018.
U.S. Appl. No. 15/602,287, filed May 23, 2017.

*Primary Examiner* — Iriana Cruz
(74) *Attorney, Agent, or Firm* — IPUSA, PLLC

(57) ABSTRACT

An input/output device that provides a device cooperation service is connected to an input/output service apparatus that provides an input/output service and a computer system that provides a storage service via a network. The input/output device includes a processor configured to execute a program stored in a memory to implement processes of acquiring use restriction information for restricting designation of a condition in a request to the input/output service from the input/output device, and restricting designation of the condition in the request to the input/output service from the input/output device by reflecting the acquired use restriction information on a device cooperation service screen for enabling a user to designate the condition in the request.

7 Claims, 15 Drawing Sheets

(51) Int. Cl.
*G06F 3/12* (2006.01)
*H04N 1/44* (2006.01)
*H04N 21/422* (2011.01)
*H04N 1/32* (2006.01)

(52) U.S. Cl.
CPC ....... *H04N 1/00225* (2013.01); *H04N 1/4426* (2013.01); *H04N 1/4433* (2013.01); *H04N 21/42204* (2013.01); *H04N 1/00244* (2013.01); *H04N 1/00344* (2013.01); *H04N 1/00464* (2013.01); *H04N 1/00474* (2013.01); *H04N 1/32096* (2013.01); *H04N 2201/0044* (2013.01); *H04N 2201/0094* (2013.01)

(58) Field of Classification Search
CPC ........... H04N 1/4433; H04N 21/42204; H04N 1/00244; H04N 1/00344; H04N 1/00464; H04N 1/00474; H04N 1/32096; H04N 2201/0044; H04N 2201/0094
See application file for complete search history.

(56) References Cited

U.S. PATENT DOCUMENTS

| | | | |
|---|---|---|---|
| 2011/0310422 A1* | 12/2011 | Hagiwara | G03G 15/5016 358/1.13 |
| 2014/0126016 A1* | 5/2014 | Namihira | H04N 1/32534 358/1.15 |
| 2015/0067510 A1 | 3/2015 | Hashikami et al. | |
| 2015/0070249 A1 | 3/2015 | Hashikami et al. | |
| 2016/0028923 A1* | 1/2016 | Yasuhara | H04N 1/4433 358/1.14 |
| 2016/0165076 A1 | 6/2016 | Tokiwa et al. | |
| 2016/0274854 A1 | 9/2016 | Tokiwa | |
| 2016/0366234 A1 | 12/2016 | Tokiwa | |
| 2017/0090827 A1 | 3/2017 | Tokiwa | |
| 2017/0257514 A1 | 9/2017 | Hashikami et al. | |

\* cited by examiner

FIG.8

| App Profile Management/Tenant ○○○/ External Storage Cooperation/Scan to Storage | 2000 |
|---|---|

Scan to Storage

Storage Settings

Storage: Select storage... ~2002

Common Settings

- Initial Folder ID: Select folder... (Root Folder)
- Initial Display Screen: Folder Hierarchy Screen ▼
- Error Notification Address: aaa@xxx.com
- Email Title: %FILENAME - △△△ Cloud Services
- Email Body:

}2004

- Scan Color Mode: Auto Color Selection ▼
  - ☑ Disable change to scan color mode
- Document Side: One Sided ▼
  - ☐ Disable change to document side
- Document Orientation: Readable Orientation ▼
  - ☐ Disable change to document orientation
- Scan Resolution: 300 ▼
  - ☐ Disable change to scan resolution

}2006

- Document Format: PDF ▼
  - ☐ Disable change to document format

}2008

- Preview Scanned Document: No ▼

}2006

- OCR: Japanese ▼  ~2010
- 2012~ ☑ Disable change to OCR

}2008

Save ~2014

FIG.11

```
{
    url: "https://foo.△△△.com/io/□□□-upload",
    headers: {
        "Content-Type": "application/json"
    },
    body: {
        "tenantID": "TENANT_ID",
        "uploadFolderId": "UPLOAD_FOLDER_ID",
        "filename": "FILE_NAME.pdf",
        "documentFormat": "pdf",
        "ocr": "Japanese"
    }
}
```

FIG.13

```
{
    "storage": {
        "service": "□□□"
    },
    "common": {
        "scanColor": "auto_color",
        "originalSide": "one_sided",
        "originalOrientation": "readable",
        "scanResolution": "300",
        "documentFormat": "pdf",
        "originalPreview": "false",
        "ocr": "Japanese",
        "disabledScanColor": true,
        "disabledOriginalSide": false,
        "disabledOriginalOrientation": false,
        "disabledScanResolution": false,
        "disabledDocumentFormat": false,
        "disabledOcr": true
    }
}
```

FIG.14

| APPLICATION ID | MFP APPLICATION NAME | USE RESTRICTION INFORMATION ID | APP ID | FLOW ID |
|---|---|---|---|---|
| application1 | Scan to Storage | limitation1 | app1 | flow1 |
| application2 | Scan to Mail | limitation2 | app2 | flow1 |
| ... | ... | ... | ... | ... |

FIG.15A

| APPLICATION ID | MFP APPLICATION NAME | USE RESTRICTION INFORMATION ID | APP ID | FLOW ID |
|---|---|---|---|---|
| application1 | Scan to A-Storage | limitation1 | app1 | flow1 |
| application2 | Scan to B-Storage | limitation2 | app1 | flow2 |
| application3 | Scan to A-Storage-monochrome | limitation3 | app1 | flow1 |
| ... | ... | ... | ... | ... |

FIG.15B

| USE RESTRICTION INFORMATION ID | SCAN COLOR MODE | SCAN COLOR MODE CHANGE DISABLED | OCR | OCR CHANGE DISABLED | ... |
|---|---|---|---|---|---|
| limitation1 | AUTO COLOR SELECTION | TRUE | JAPANESE | FALSE | ... |
| limitation2 | FULL COLOR | TRUE | JAPANESE | FALSE | ... |
| limitation3 | MONOCHROME | FALSE | JAPANESE | TRUE | ... |

INFORMATION PROCESSING SYSTEM FOR FACILITATING DESIGNATION OF RESTRICTION CONDITIONS IN REQUESTS TO AN INPUT/OUTPUT SERVICE RECEIVED FROM AN INPUT/OUTPUT DEVICE

CROSS-REFERENCE TO RELATED APPLICATIONS

The present application claims priority under 35 U.S.C. § 119 to Japanese Patent Application No. 2016-250773 filed on Dec. 26, 2016 and Japanese Patent Application No. 2017-230718 filed on Nov. 30, 2017, the entire contents of which are incorporated herein by reference.

BACKGROUND OF THE INVENTION

1. Field of the Invention

The present invention relates to an input/output device and an information processing system.

2. Description of the Related Art

Services that enable cooperation between a document input/output device, such as a multifunction peripheral (MFP), and a computer system that provides an external storage service offering a storage area via a network are known (such services being referred to as "device cooperation services" hereinafter). A "scan to storage service" is an example of such a device cooperation service for delivering scanned image data acquired by an MFP application to a preset external storage service.

Also, image formation restriction control systems are known that are configured to properly restrict use of each image forming apparatus connected to a network, for example. A typical image formation restriction control system restricts use of an image forming apparatus by a user when a total sum of the number of sheets used over a predetermined time period exceeds a use limit (maximum number of sheets) set up for the user, and notifies the user that a use restriction has been imposed according to a predetermined notification method (see, e.g., Japanese Unexamined Patent Publication No. 2008-152499).

An administrator typically imposes restrictions on a user's ability to designate scan conditions of a device cooperation service in order to have the user conform to rules relating to scan operations. However, restrictions on the designation of scan conditions that are set up in typical device cooperation services restrict designation of conditions in a scan job for an input/output device. Thus, such restrictions on the designation of scan conditions cannot restrict designation of conditions in a request to an input/output service from the input/output device.

SUMMARY OF THE INVENTION

An aspect of the present invention is directed to enabling an input/output device that provides a device cooperation service to restrict designation of a condition in a request to an input/output service.

According to one embodiment of the present invention, an input/output device that provides a device cooperation service is connected to an input/output service apparatus that provides an input/output service and a computer system that provides a storage service via a network. The input/output device includes a processor configured to execute a program stored in a memory to implement processes of acquiring use restriction information for restricting designation of a condition in a request to the input/output service from the input/output device, and restricting designation of the condition in the request to the input/output service from the input/output device by reflecting the acquired use restriction information on a device cooperation service screen for enabling a user to designate the condition in the request.

BRIEF DESCRIPTION OF THE DRAWINGS

FIG. 8 is a diagram illustrating an example of a use restriction setting screen;

FIG. 11 is a diagram illustrating an example of an upload condition included in a request to an input/output service;

FIG. 13 is a diagram illustrating an example of use restriction information;

FIG. 14 is a table illustrating an example configuration of use restriction information registered in a use restriction information storage unit; and FIGS. 15A and 15B are tables illustrating another example configuration of use restriction information registered in the use restriction information storage unit.

DESCRIPTION OF THE EMBODIMENTS

In the following, embodiments of the present invention are described with reference to the accompanying drawings.

<System Configuration>

First, the system configuration of an information processing system 1 according to an embodiment of the present invention will be described with reference to FIG. 1.

Figure 1:
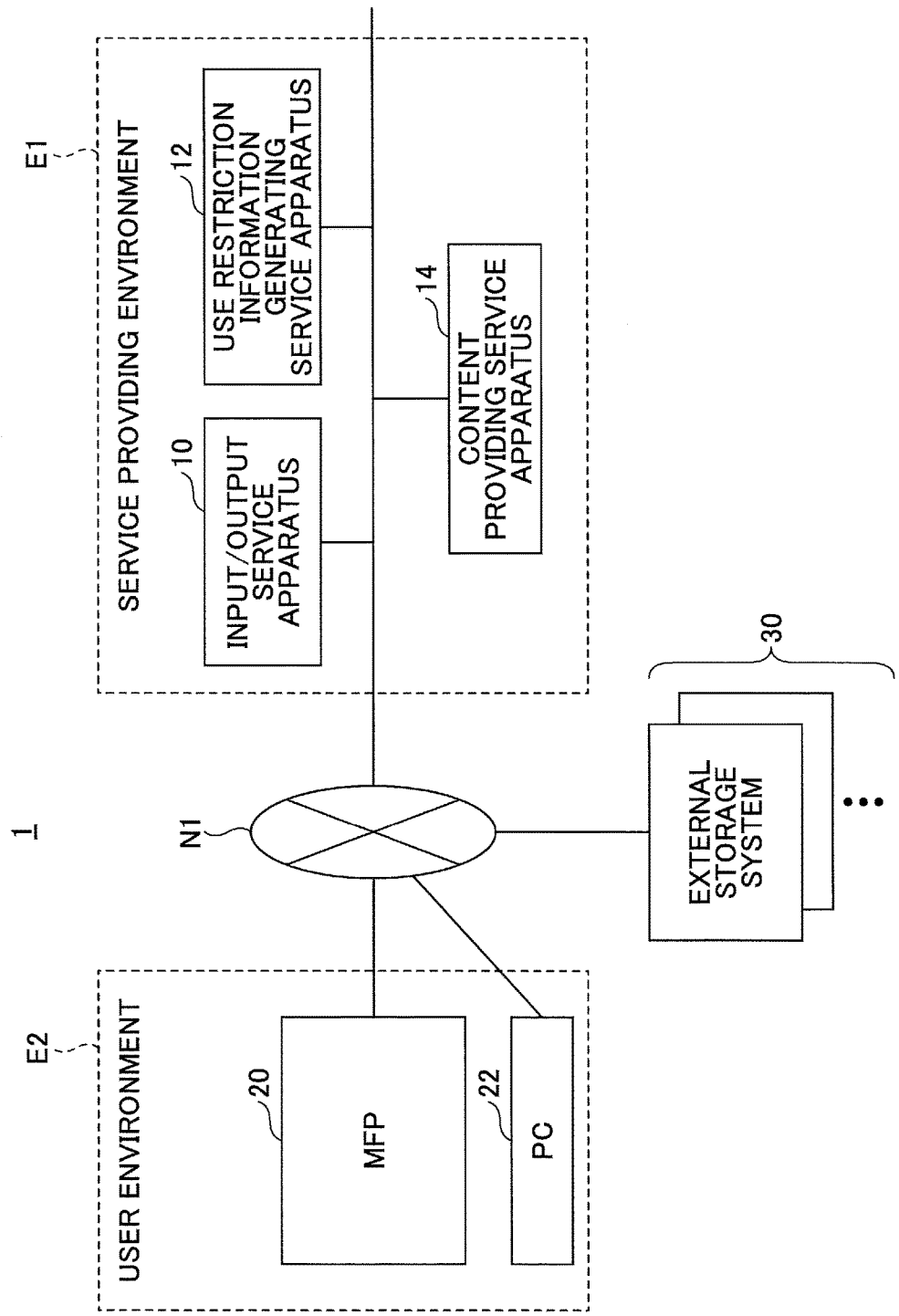
FIG. 1 is a diagram illustrating an example configuration of an information processing system according to an embodiment of the present invention.

FIG. 1 is a diagram illustrating an example configuration of the information processing system 1 according to the present embodiment.

In FIG. 1, the information processing system 1 includes a service providing environment E1, a user environment E2, and an external storage system 30 that are communicably connected to each other via a wide area network N1, such as the Internet.

The service providing environment E1 is a system environment within an organization that provides various services, such as a cloud service, in cooperation with the external storage system 30 via the network N1. Note that the present embodiment may be applied to various services that are provided via a network, such as a service provided by an ASP (Application Service Provider) or a web service, for example.

The service providing environment E1 may be implemented by one or more information processing apparatuses. In the example of FIG. 1, the service providing environment E1 includes an input/output service apparatus 10, a use restriction information generating service apparatus 12, and a content providing service apparatus 14.

The user environment E2 is a system environment within an organization, such as a corporate user that uses an input/output device, such as a multifunction peripheral (MFP) 20. In FIG. 1, the user environment E2 includes at least one MFP 20 and at least one personal computer (PC) 22.

The external storage system 30 is a computer system that provides an external storage service referred to as online storage via the network N1. The external storage service is a service that offers a storage area via the network N1. In the present embodiment, the storage area offered by the external storage system 30 is a delivery destination candidate to which image data may be delivered and stored.

In the information processing system 1 of FIG. 1, the input/output service apparatus 10, the use restriction information generating service apparatus 12, and the content providing service apparatus 14 of the service providing environment E1 may be connected to the network N1 via a LAN, for example. The MFP 20 and the PC 22 of the user environment E2 may also be connected to the network N1 via a LAN, for example.

The input/output service apparatus 10 provides services for implementing functions, such as absorbing differences between unique functions of one or more external storage systems 30 (e.g. capability of adding bibliographic information), an OCR (optical character recognition) function, a file conversion function, and the like (hereinafter referred to as "input/output service"). The input/output service apparatus 10 provides an input/output service that is implemented by the cooperation between an application of the input/output service apparatus 10 and the MFP 20 of the user environment E2. Note that the input/output service may be used to facilitate development of a service that is implemented by the cooperation between the MFP 20, as an example of an input/output device, and the external storage system (hereinafter referred to as "device cooperation service").

The use restriction information generating service apparatus 12 generates use restriction information for restricting use of a condition for uploading data to the input/output service apparatus 10. Also, the use restriction information generating service apparatus 12 generates use restriction information for restricting use of a condition for downloading data from the input/output service apparatus 10. An administrator, such as a system administrator or a business operations administrator, that wishes to impose rules on users with respect to scanning or printing operations may access the use restriction information generating service apparatus 12 from the PC 22 and specify desired use restriction information to be generated. Note that screens provided by the use restriction information generating service apparatus 12 to the PC 22 as well as the use restriction information will be described in detail below.

An application installed in the MFP 20 for implementing the device cooperation service (hereinafter referred to as "MFP application") is a web application that runs on a browser (web browser) installed in the MFP 20. For example, the MFP application maybe described in HTML (Hypertext Markup Language), CSS (Cascading Style Sheets), and JavaScript (registered trademark). The content providing service apparatus 14 provides the MFP application to the MFP 20. For example, the content providing service apparatus 14 may be implemented by a service program that provides the MFP application and an information processing apparatus that runs the service program.

For example, the input/output service apparatus 10 may provide a scan delivery service for delivering scanned image data acquired by the MFP 20 to the external storage system 30. The input/output service device 10 may also provide a download print service for causing the MFP 20 to print out print data acquired from the external storage system 30. In the present embodiment, the scan delivery service will be described as an example input/output service.

Note, however, that input/output services provided by the input/output service apparatus 10 are not limited to a scan delivery service and a download print service. Also, the configuration of the information processing system 1 is not limited to the example configuration illustrated in FIG. 1, and in other examples, all or a part of the elements provided in the service providing environment E1 may be provided in the user environment E2. That is, all or part of the information processing apparatuses implementing the service providing environment E1 may be included in the user environment E2.

Further, the user environment E2 may include various devices in addition to the MFP 20, such as a scanner, a printer, a facsimile machine, a digital whiteboard, a projector, and the like. The above various devices, such as the MFP 20, a scanner, a printer, a facsimile machine, a digital whiteboard, and projector are examples of input/output devices. Also, the PC 22 is an example of a terminal apparatus and may be a smartphone, a tablet terminal, a mobile phone, or the like.

<Hardware Configuration>
<<Computer>>

Figure 2:
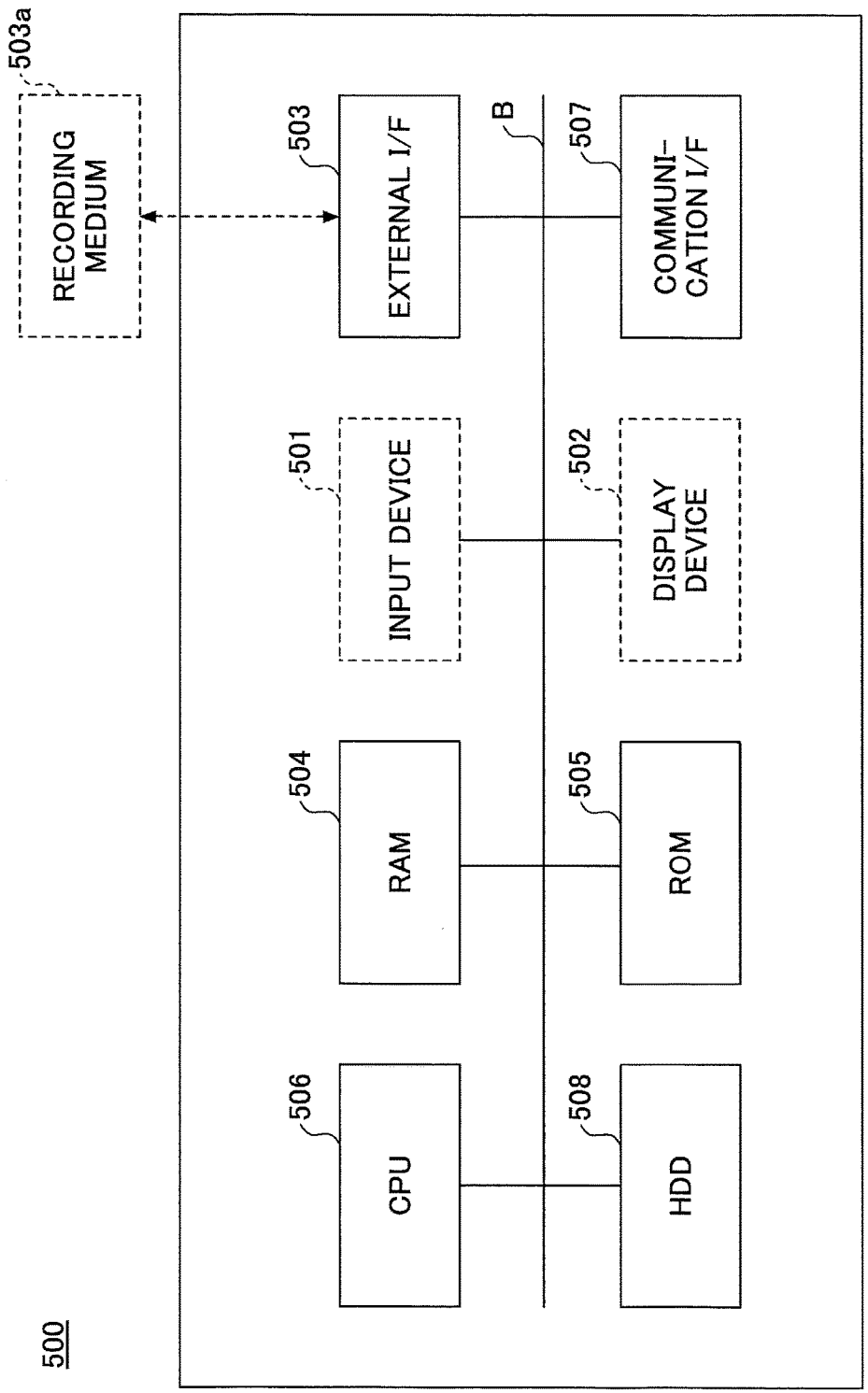
FIG. 2 is a diagram illustrating an example hardware configuration of a computer according to an embodiment of the present invention.

The input/output service apparatus 10, the use restriction information generating service apparatus 12, the content providing service apparatus 14, the PC 22, and the external storage system 30 may be implemented by a computer having a hardware configuration as illustrated in FIG. 2, for example. FIG. 2 is a diagram illustrating an example hardware configuration of a computer 500 according to the present embodiment.

In FIG. 2, the computer 500 includes an input device 501, a display device 502, an external I/F (interface) 503, a RAM (random access memory) 504, a ROM (read-only memory) 505, a CPU (central processing unit) 506, a communication I/F 507, an HDD (hard disk drive) 508 that are connected to each other via a bus B. Note that in some embodiments, the input device 501 and the display device 502 may be connected and used as necessary.

The input device 501 may include a keyboard, a mouse, and/or a touch panel, for example, and is used by a user to input an operation signal. The display device 502 may include a display for displaying processing results of processes executed by the computer 500, for example.

The communication I/F 507 is an interface that connects the computer 500 to various networks. In this way, the computer 500 can perform data communication via the communication I/F 507.

The HDD 508 is an example of a nonvolatile storage device that stores programs and data. The stored programs and data include an OS corresponding to basic software for controlling the entire computer 500 and application software (also referred to as "app" hereinafter) that provides various functions on the OS. Note that in some embodiments, the computer 500 may use a drive device that uses a flash memory as a storage medium, such as an SDD (solid state drive), instead of the HDD 508, for example.

The external I/F 503 is an interface with an external device. The external device may include a recording medium 503a, for example. In this way, the computer 500 can read and/or write data from/to the recording medium 503a via the external I/F 503. The recording medium 503a may be a flexible disk, a CD, a DVD, an SD memory card, a USB memory, or the like.

The ROM 505 is an example of a nonvolatile semiconductor memory (storage device) that can hold programs and data even when the power is turned off. The ROM 505 stores programs and data such as a basic input-output system (BIOS) that is executed when the computer 500 is started, OS settings, network settings, and the like. The RAM 504 is an example of a volatile semiconductor memory (storage device) that temporarily holds programs and data.

The CPU 506 is a computing device that implements functions of the computer 500 and performs overall control of the computer 500 by loading a program and/or data from a storage device, such as the ROM 505 or the HDD 508, into the RAM 504, and executing relevant processes.

The input/output service apparatus 10, the use restriction information generating service apparatus 12, the content providing service apparatus 14, the PC 22, and the external storage system 30 may use the computer 500 having the hardware configuration as illustrated in FIG. 2 to implement various processes as described below, for example.

<<MFP>>

Figure 3:
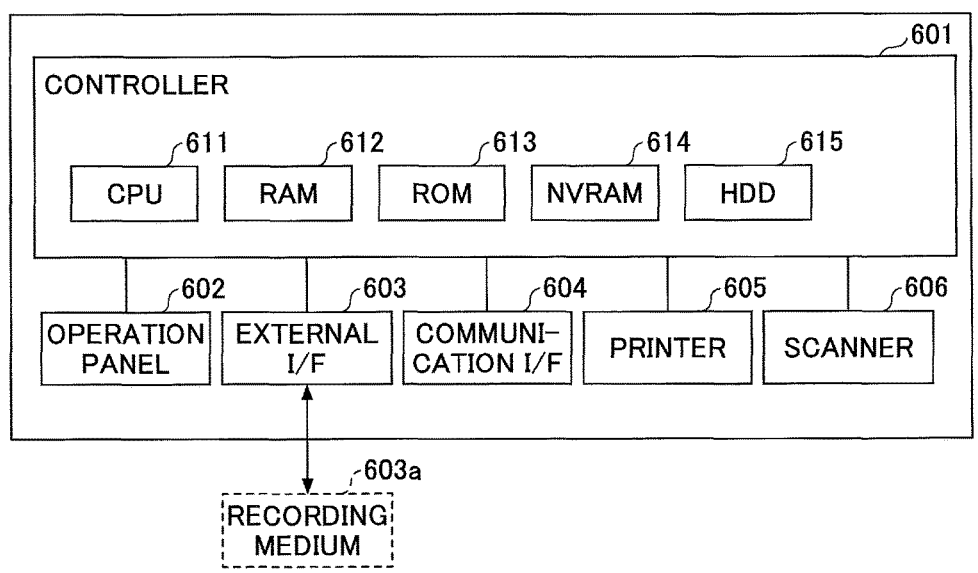
FIG. 3 is a diagram illustrating an example hardware configuration of a multifunction peripheral according to an embodiment of the present invention.

The MFP 20 of FIG. 1 may be implemented by a computer having a hardware configuration as illustrated in FIG. 3, for example. FIG. 3 is a diagram illustrating an example hardware configuration of the MFP 20 according to the present embodiment. In FIG. 3, the MFP 20 includes a controller 601, an operation panel 602, an external I/F 603, a communication I/F 604, a printer 605, and a scanner 606.

The controller 601 includes a CPU 611, a RAM 612, a ROM 613, an NVRAM 614, and an HDD 615. The ROM 613 stores various programs and data. The RAM 612 temporarily holds programs and data. The NVRAM 614 may store setting information and the like. The HDD 615 may store various programs and data.

The CPU 611 implements functions of the MFP 20 and performs overall control of the MFP 20 by loading a program, data, and/or setting information from a storage device, such as the ROM 613, the NVRAM 614, and/or the HDD 615, into the RAM 612, and executing relevant processes.

The operation panel 602 includes an input unit that accepts an input from a user and a display unit that displays information. The external I/F 603 is an interface with an external device. The external device may be a recording medium 603a, for example. In this way, the MFP 20 can read and/or write data from/to the recording medium 603a via the external I/F 603. The recording medium 603a may be an IC card, a flexible disk, a CD, a DVD, an SD memory card, or a USB memory, for example.

The communication I/F 604 is an interface that connects the MFP 20 to the network N1. In this way, the MFP 20 can perform data communication via the communication I/F 604. The printer 605 is a device for printing print data on a print medium, such as paper. The scanner 606 is a device for scanning a document to acquire image data (electronic data) of the document.

<Functional Configuration>

In the following, the functional configuration of the information processing system 1 according to the present embodiment will be described.

<<Input/Output Service Apparatus>>

Figure 4:
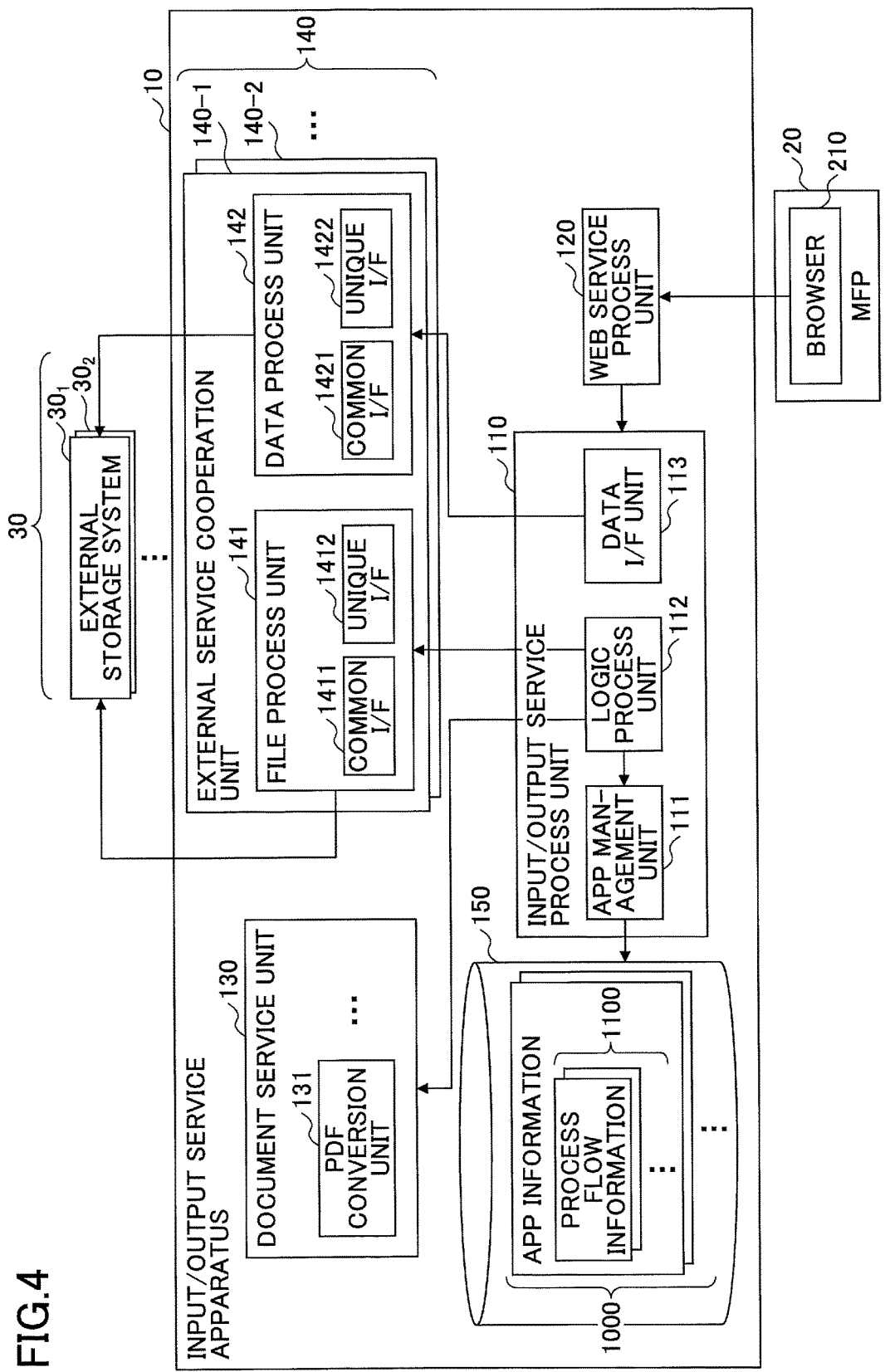
FIG. 4 is a diagram illustrating an example functional configuration of an input/output service apparatus according to an embodiment of the present invention.

FIG. 4 is a diagram illustrating an example functional configuration of the input/output service apparatus 10 according to the present embodiment.

Note that in FIG. 4, the MFP 20 and the external storage system 30 are illustrated in addition to the input/output service apparatus 10. The MFP 20 has a browser 210 installed therein. A user of the MFP 20 can use the input/output service provided by the input/output service apparatus 10 via the browser 210. As described above, an input/output device (e.g. MFP 20) according to the present embodiment has the browser 210 installed therein.

The input/output service apparatus 10 according to the present embodiment includes an input/output service process unit 110, a web service process unit 120, a document service unit 130, and an external service cooperation unit 140. Each of the above units may be implemented by the CPU 506 executing a process based on one or more programs installed in the input/output service apparatus 10.

The input/output service apparatus 10 according to the present embodiment also includes an app information storage unit 150. The app information storage unit 150 may be implemented by the HDD 508, for example. Note that the app information storage unit 150 may also be implemented by a storage device that is connected to the input/output service apparatus 10 via a network, for example.

The input/output service process unit 110 performs processes associated with the input/output service. In FIG. 4, the input/output service process unit 110 includes an app management unit 111, a logic process unit 112, and a data I/F unit 113.

The app management unit 111 manages app information 1000 stored in the app information storage unit 150. The app information 1000 includes information relating to applications (apps) for enabling the input/output service device 10 to provide various input/output services. That is, the various input/output services provided by the input/output service apparatus 10 are provided by the app information 1000.

Also, in response to receiving a request from the logic process unit 112, the app management unit 111 sends process flow information 1100 included in the app information 1000 to the logic process unit 112. The process flow information 1100 defines a series of processes (process flow) for implementing the input/output service provided by the app information 1000. For example, the process flow information 1100 may define a series of processes (process flow) that includes performing an OCR process on scanned image data that has been acquired by the MFP 20 and delivering the processed image data to a preset external storage system 30.

The logic process unit 112 acquires the process flow information 1100 from the app management unit 111 in response to a request from the web service process unit 120. Based on the acquired processing flow information 1100, the logic process unit 112 executes a process flow for implementing the input/output service. In this way, various input/output services can be provided by the input/output service apparatus 10 of the information processing system 1 according to the present embodiment.

The data I/F unit 113 makes various requests to the data processing unit 142 of the external service cooperation unit 140 in response to a request from the web service processing unit 120. For example, the data I/F unit 113 may issue a folder list acquisition request to the data processing unit 142 of the external service cooperation unit 140.

The web service processing unit 120 makes various requests to the input/output service process unit 110 in response to a request from the browser 210. For example, the web service process unit 120 may issue a scan delivery service process execution request to the logic process unit 112 of the input/output service process unit 110 in response to a request from the browser 210.

The document service unit 130 is implemented by a group of programs (modules) for executing processes included in a series of processes (process flow) defined by the process flow information 1100. The document service unit 130 includes a PDF conversion unit 131 for converting the data format of an electronic file into the PDF format as an example.

Note that the document service unit 130 may include various programs, such as a print conversion unit for converting an electronic file into a data format (print data) that can be printed by the MFP 20 and/or a compression/decompression process unit for compressing or decompressing an electronic file, for example.

The external service cooperation unit 140 makes various requests to the external storage system 30 in response to requests from the logic process unit 112 and the data I/F unit 113. The input/output service apparatus 10 according to the present embodiment includes a corresponding external service cooperation unit 140 for each external storage system 30.

The external service cooperation unit 140 includes a file process unit 141 that receives a request from the logic processing unit 112, and a data process unit 142 that receives a request from the data I/F unit 113.

The file process unit 141 includes a common I/F 1411 and a unique I/F 1412 that define APIs (Application Programming Interfaces) for performing operations with respect to an electronic file stored in the external storage system 30. The operations to be performed with respect to an electronic file may include acquisition, storage, and editing of the electronic file, for example.

The common I/F 1411 defines APIs that can be commonly used among a plurality of external storage systems 30. That is, the common I/F 1411 of the file process unit 141 corresponds to a group of APIs for implementing functions related to file operations (e.g., acquisition and storage of electronic file) that can be used by all the external storage systems 30.

On the other hand, the unique I/F 1412 defines APIs that can be used by a specific external storage system 30. That is, the unique I/F 1412 of the file process unit 141 corresponds to a group of APIs for implementing functions related to file operations (e.g., editing of electronic file) that can be used by a specific external storage system 30.

Thus, the common I/F 1411 is similarly defined for all the external service cooperation units 140. On the other hand, the unique I/F 1412 is uniquely defined for the corresponding external service cooperation unit 140 associated with the specific external storage system 30 that is able to use the API included in the unique I/F 1412.

The data process unit 142 includes a common I/F 1421 and a unique I/F 1422 that define APIs for acquiring metadata such as bibliographic information (e.g., file list, folder list) of an electronic file stored in the external storage system 30.

The common I/F 1421 defines APIs that can be commonly used among a plurality of external storage systems 30. That is, the common I/F 1421 of the data process unit 142 corresponds to a group of APIs for implementing functions such as metadata acquisition (e.g., acquisition of a file list or folder list) that can be used by all the external storage systems 30.

On the other hand, the unique I/F 1422 defines APIs that can be used by a specific external storage system 30. That is, the unique interface 1422 of the data process unit 142 corresponds to a group of APIs for implementing functions such as metadata acquisition (e.g., acquisition of an image file list) that can be used by a specific external storage system 30.

Thus, the common I/F 1421 is similarly defined for all the external service cooperation units 140. On the other hand, the unique I/F 1422 is uniquely defined for the corresponding external service cooperation unit 140 associated with the specific external storage system 30 that is able to use the API included in the unique I/F 1422.

Note that when an external storage system 30 with which the input/output service apparatus 10 can cooperate (hereinafter referred to as "cooperation counterpart") is added or deleted, a corresponding external service cooperation unit 140 for the external storage system 30 may added or deleted, for example.

The input/output service apparatus 10 according to the present embodiment is capable of localizing the impact of adding an external storage system 30 as a cooperation counterpart. In other words, the input/output service apparatus 10 according to the present embodiment is capable of adding an external storage system 30 as a cooperation counterpart without affecting other functional components (e.g., input/output service process unit 110, web service process unit 120), for example. Note that the input/output service apparatus 10 according to the present embodiment may add a corresponding external service cooperation unit 140 using a SDK (Software Development Kit), for example.

The app information storage unit 150 stores the app information 1000 in association with an app ID of an application for providing an input/output service (referred to as "app ID" to be distinguished from an application ID of an MFP application), for example. The app information 1000 includes one or more sets of process flow information 1100. As described above, the process flow information 1100 is information that defines a series of processes (process flow) for implementing an input/output service provided by the app information 1000.

<<MFP>>

Figure 5:
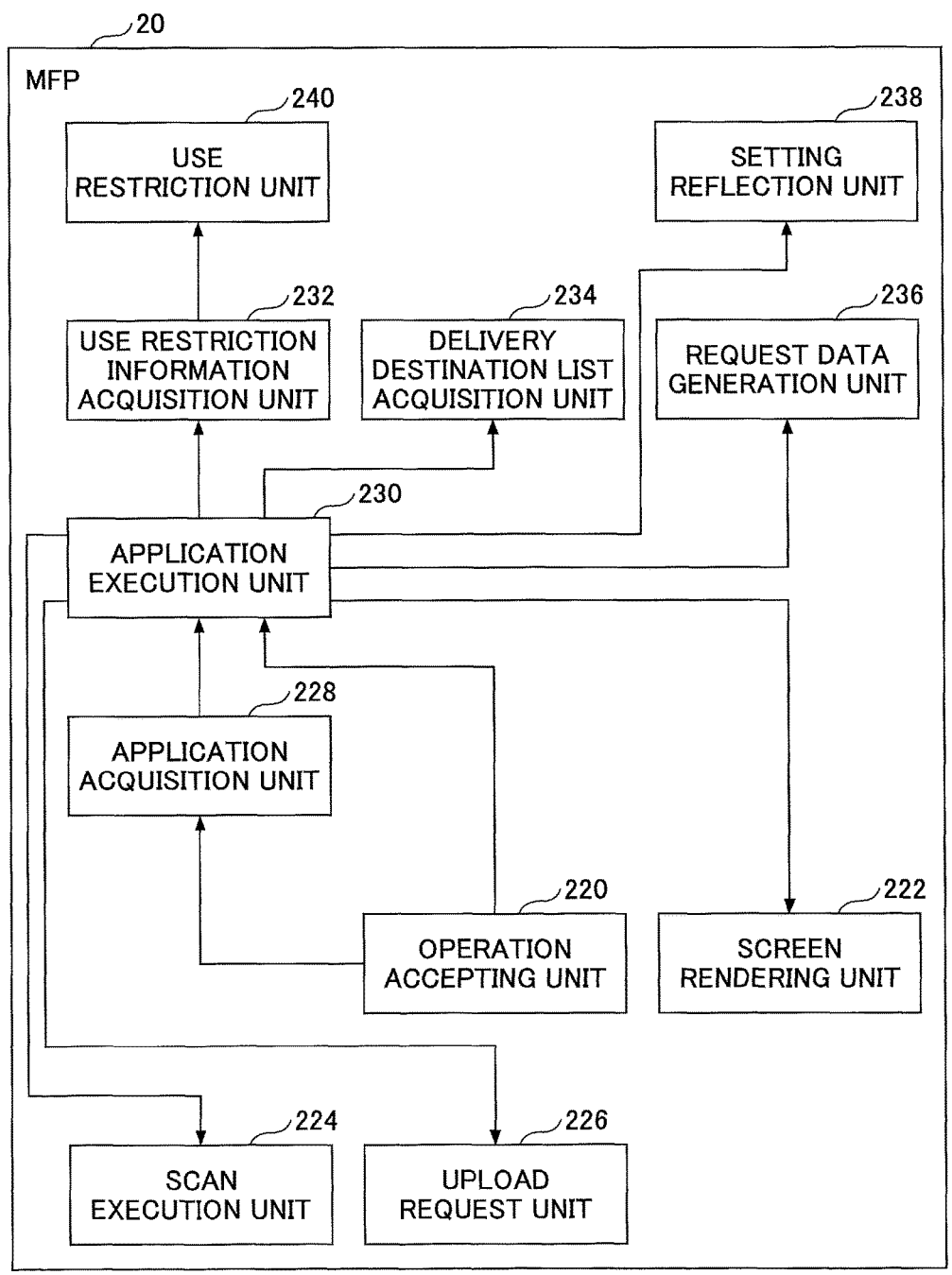
FIG. 5 is a diagram illustrating an example functional configuration of the multifunctional peripheral according to an embodiment of the present invention.

FIG. 5 is a diagram illustrating an example functional configuration of the MFP 20 according to the present embodiment. Note that illustrations of functions of the MFP 20 that are not particularly relevant to the implementation of the present embodiment are omitted in the functional configuration diagram of FIG. 5. The MFP 20 of FIG. 5 includes an operation accepting unit 220, a screen rendering unit 222, a scan execution unit 224, and an upload request unit 226. Further, the MFP 20 includes an application acquisition unit 228, an application execution unit 230, a use restriction information acquisition unit 232, a delivery destination list acquisition unit 234, a request data generation unit 236, a setting reflection unit 238, and a use restriction unit 240.

For example, each of the above functional units of FIG. 5 may be implemented by the browser 210 installed in the MFP 20 executing an MFP application. The operation accepting unit 220, the screen rendering unit 222, the scan execution unit 224, the upload request unit 226, and the application acquisition unit 228 execute processes relating to control of the MFP 20. The application execution unit 230, the use restriction information acquisition unit 232, the delivery destination list acquisition unit 234, the request data generation unit 236, the setting reflection unit 238, and the use restriction unit 240 may be implemented by scripts included in the MFP application, for example.

The operation accepting unit 220 accepts a user operation, such as selection of a delivery destination folder, change of a scan condition, or a job execution instruction, for example. The screen rendering unit 222 renders a screen of an MFP application for implementing a device cooperation service (device cooperation service screen) on the operation panel 602. The scan execution unit 224 sends a scan execution request to the scanner 606 and causes the scanner 606 to execute a scan process. The upload request unit 226 sends an upload request to the input/output service apparatus 10 to have scanned image data uploaded to the external storage system 30.

The application acquisition unit 228 acquires an MFP application from the content providing service apparatus 14. The content providing service apparatus 14 provides the MFP application, which may be described in HTML, CSS, and JavaScript, for example, to the MFP 20. The application execution unit 230 executes the MFP application.

The use restriction information acquisition unit 232 acquires use restriction information from the use restriction information generating service apparatus 12. The use restriction unit 240 interprets the acquired use restriction information and reflects the use restriction information on the device cooperation service screen of the MFP application by disabling a change to a value of a setting item on which a use restriction is imposed, for example.

The delivery destination list acquisition unit 234 acquires a folder list from the external storage system 30 in order to display a list of folders of the external storage system 30 corresponding to delivery destination candidates. The request data generation unit 236 generates request data (upload condition) to be sent to the input/output service apparatus 10. The setting reflection unit 238 controls settings to reflect a delivery destination folder and scan conditions selected by the user, for example.

<<Use Restriction Information Generating Service Apparatus>>

Figure 6:
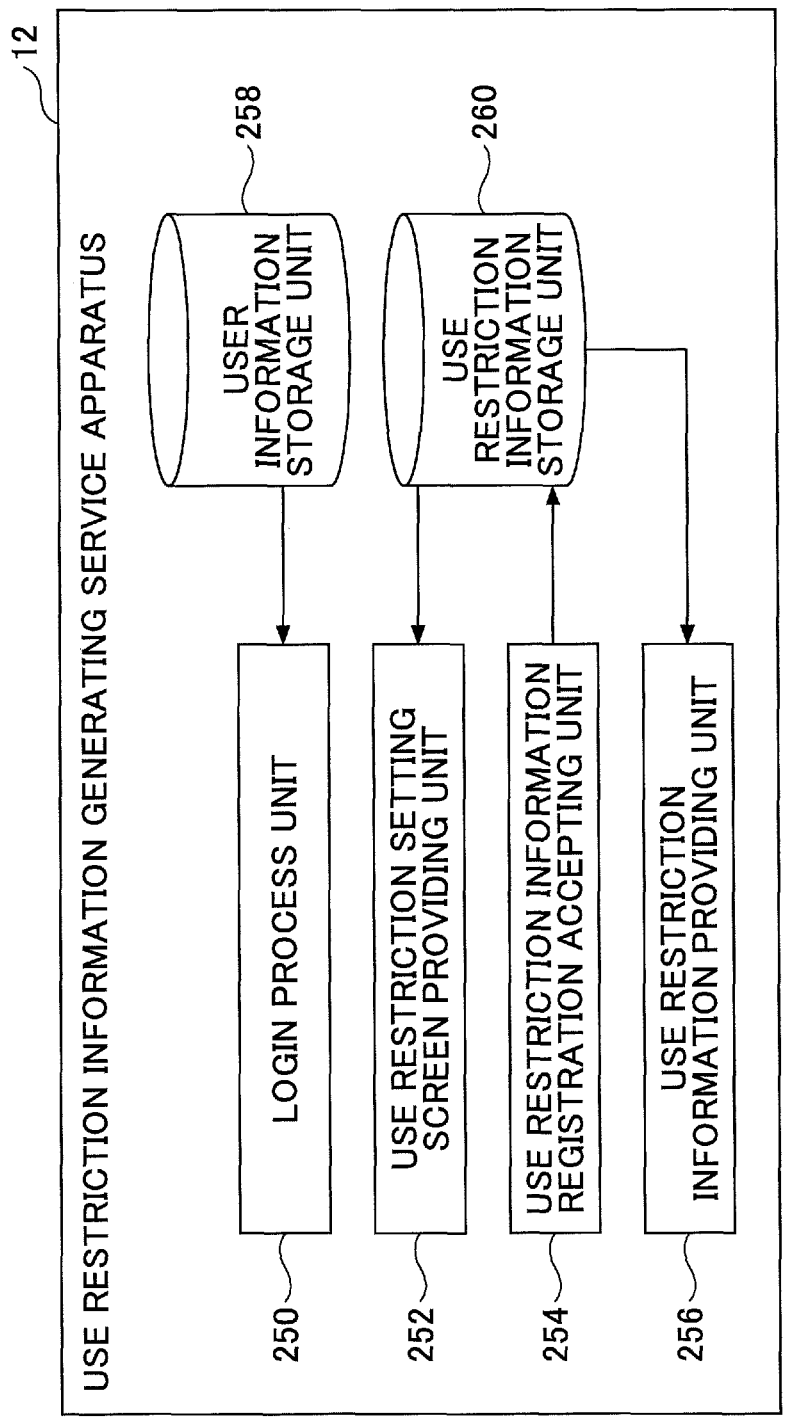
FIG. 6 is a diagram illustrating an example functional configuration of a use restriction information generating service apparatus according to an embodiment of the present invention.

FIG. 6 is a diagram illustrating an example functional configuration of the use restriction information generating service apparatus 12 according to the present embodiment. In FIG. 6, the use restriction information generating service apparatus 12 includes a login process unit 250, a use restriction setting screen providing unit 252, a use restriction information registration accepting unit 254, and a use restriction information providing unit 256. Each of the above functional units may be implemented by the CPU 506 executing one or more programs installed in the use restriction information generating service apparatus 12, for example.

The use restriction information generating service apparatus 12 according to the present embodiment also includes a user information storage unit 258 and a use restriction information storage unit 260. The user information storage unit 258 and the use restriction information storage unit 260 may be implemented by the HDD 508, for example. The user information storage unit 258 and the use restriction information storage unit 260 may also be implemented by a storage device that is connected to the use restriction information generating service apparatus 12 via a network, for example.

The login process unit 250 receives a login request from an external apparatus, such as the PC 22, and performs a login process using the user information stored in the user information storage unit 258. Upon successful login, the login process unit 250 allows the PC 22 access to services provided by the use restriction information generating service apparatus 12. When the use restriction setting screen providing unit 252 receives a use restriction setting screen display request designating an application ID from the PC 22, the use restriction setting screen providing unit 252 uses the use restriction information stored in the use restriction information storage unit 260 to provide use restriction setting screen data relating to a device cooperation service associated with the designated application ID to the PC 22.

The use restriction information registration accepting unit 254 accepts a registration request for registering use restriction information from the PC 22 and registers the use restriction information in association with an application ID in the use restriction information storage unit 260. When the use restriction information providing unit 256 receives a use restriction information acquisition request designating an application ID from the MFP 20, the use restriction information providing unit 256 provides the use restriction information that is stored in association with the designated application ID in the use restriction information storage unit 260 to the MFP 20.

<Detailed Process Operations>

In the following, detailed process operations of the information processing system 1 according to the present embodiment will be described.

<<Registration Phase>>

Figure 7:
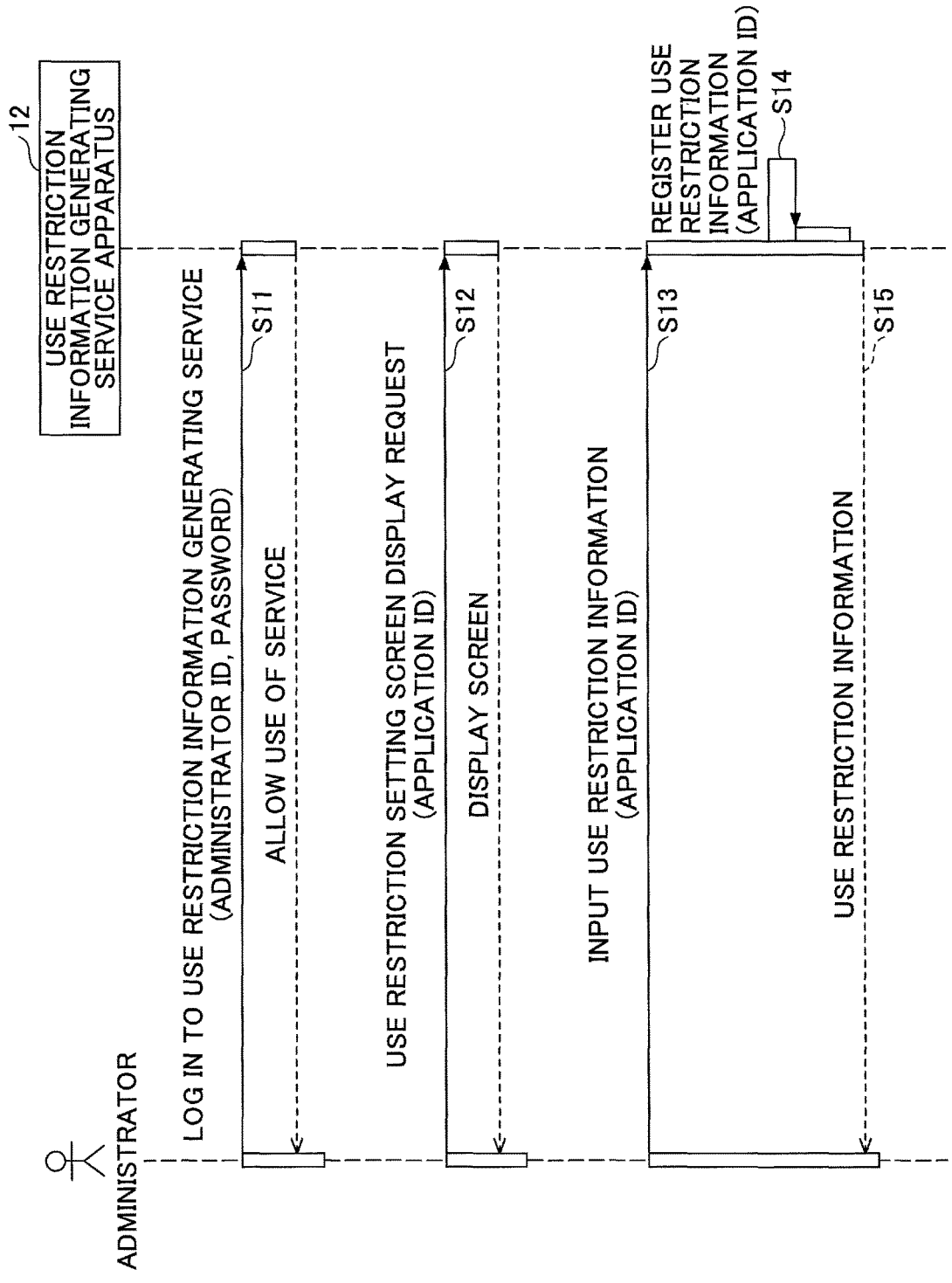
FIG. 7 is a sequence chart illustrating example process operations executed in a registration phase according to an embodiment of the present invention.

FIG. 7 is a sequence chart illustrating example process operations executed in a registration phase. FIG. 7 illustrates an example process sequence in which an administrator (e.g., IT/operations administrator) registers use restriction information in the use restriction information generating service apparatus 12 for restricting use of an upload condition for uploading data to the input/output service apparatus 10 or a download condition for downloading data from the input/output service apparatus 10.

Note that although the administrator is depicted as directly operating the use restriction information generating service apparatus 12 to register use restriction information in FIG. 7, the administrator may in fact be operating the PC 22 that is connected to the use restriction information generating service apparatus 12 via a network, for example.

In step S11, the administrator designates an administrator ID and a password and issues a login request to the use restriction information generating service apparatus 12. The login process unit 250 of the use restriction information generating service apparatus 12 accepts the login request from the PC 22 and performs a login process using the user information stored in the user information storage unit 258. Upon successful login, the login process unit 250 of the use restriction information generating service apparatus 12 allows the PC 22 to use services provided by the use restriction information generating service apparatus 12.

Then, in step S12, the PC 22 designates an application ID corresponding to a device cooperation service selected by the administrator in a use restriction setting screen display request and sends the use restriction setting screen display request to the use restriction information generating service apparatus 12. In the example described below, it is assumed that an application ID corresponding to the device cooperation service "scan to storage service" is designated in the use restriction setting screen display request. When the use restriction setting screen providing unit 252 of the use restriction information generating service apparatus 12 receives the use restriction setting screen display request from the PC 22, the use restriction setting screen providing unit 252 causes the PC 22 to display a use restriction setting screen 2000 as illustrated in FIG. 8, for example, based on the use restriction information stored in association with the designated application ID in the use restriction information storage unit 260.

FIG. 8 is a diagram illustrating an example use restriction setting screen. The use restriction setting screen 2000 of FIG. 8 includes a storage designation field 2002 for designating the external storage system 30 corresponding to the delivery destination, common setting fields 2004 for designating settings, such as an initial folder ID and an initial display screen.

The use restriction setting screen 2000 also includes scan condition setting fields 2006 for designating initial values of scan conditions and whether the scan conditions can be changed, and upload condition setting fields 2008 for designating initial values of upload conditions and whether the values of the upload conditions can be changed. For example, in FIG. 8, fields for designating settings relating to input/output service processes including a document format process and an OCR process are provided as the upload condition setting fields 2008. For example, in FIG. 8, the upload condition setting fields 2008 relating to an OCR process include a field 2010 for designating a default language for the OCR process as an initial value and a check box 2012 for designating whether the language for the OCR process can be changed.

When a save button 2014 in the use restriction setting screen 2000 in FIG. 8 is pressed, the PC 22 proceeds to step S13 and sends (inputs) the use restriction information set up in the use restriction setting screen 2000 to the use restriction information generating service apparatus 12. Note that in step S13, the designated application ID is sent to the use restriction information generating service apparatus 12 along with the user restriction information. Then, in step S14, the use restriction information registration accepting unit 254 of the use restriction information generating service apparatus 12 registers the use restriction information set up in the use restriction setting screen 2000 in the use restriction information storage unit 260 as illustrated in FIG. 14, for example.

FIG. 14 is a table illustrating an example configuration of the use restriction information registered in the use restriction information storage unit 260. As illustrated in FIG. 14, the use restriction information may include information items, such as "application ID", "MFP application name", "use restriction information ID", "app ID", and "flow ID", for example. The "application ID" is information for identifying a device cooperation service and a corresponding MFP application. The "use restriction information ID" is identification information for identifying specific use restriction information content set up in the use restriction setting screen 2000 of FIG. 8. For example, the "use restriction information ID" may identify specific use restriction information content as illustrated in FIG. 13, which is described below.

The "app ID" is information identifying specific app information 1000 stored in the app information storage unit 150 for identifying an application for implementing an input/output service provided by the app information storage unit 150. The "flow ID" is information identifying specific process flow information 1100 included in the app information 1000 for identifying a series of processes (process flow) for implementing an input/output service provided by the app information storage unit 150.

Note that in the example use restriction information illustrated in FIG. 14, each entry of use restriction information (with use restriction information ID "limitation 1" and use restriction information ID "limitation 2") has the flow ID "flow 1" registered therein. However, the flow ID "flow 1" associated with the app ID "app 1" and the flow ID "flow 1" associated with the app ID "app 2" represent different process flows. That is, in the use restriction information illustrated in FIG. 14, a specific process flow (process flow information 1100) is identified by an app ID and a flow ID.

Note that in the example use restriction information of FIG. 14, the application ID and the app ID have a one-to-one relationship. However, the application ID and the app ID do not necessarily have to have a one-to-one relationship as in the example use restriction information illustrated in FIGS. 15A and 15B, for example.

FIGS. 15A and 15B are tables illustrating another example configuration of the use restriction information registered in the use restriction information storage unit 260. The information items included in the use restriction information of FIG. 15A are the same as those included in the use restriction information of FIG. 14. FIG. 15B indicates specific use restriction information content associated with the use restriction information ID of FIG. 15A.

The example use restriction information of FIG. 15A indicates that a device cooperation service with the application ID "application 1" uses process flow information 1100 with the flow ID "flow 1" that is included in app information 1000 with the app ID "app 1", and a device cooperation service with the application ID "application 2" uses different process flow information 1100 with a different flow ID "flow 2" that is included in the same app information 1000 (i.e., app information 1000 with the app ID "app1").

Also, the example use restriction information of FIG. 15A indicates that a device cooperation service with the application ID "application 3" uses the same process flow information 1100 as that used by the device cooperation service with the application ID "application 1" (i.e., process flow information 1100 with the flow ID "flow 1" included in the application information 1000 with the app ID "app 1"). Note that in a case where the application ID and the flow ID have a one-to-one relationship, the app ID may be omitted from the use restriction information of FIGS. 14 and 15A, for example.

Note that the use restriction information is output in JSON format. After the use restriction information is registered in step S14, the process proceeds to step S15 in which the use restriction information generating service apparatus 12 returns the registered use restriction information to the PC 22. In this way, the administrator can easily register use restriction information via the use restriction setting screen 2000 as illustrated in FIG. 8, for example.

Note that in some embodiments, after step S15, the information processing system 1 may implement a function of verifying whether the use restriction information registered in step S14 can be implemented by the MFP application, for example. The MFP application can interpret the use restriction information acquired from the use restriction information generating service apparatus 12 and reflect the use restriction information on the device cooperation service screen of the MFP application by displaying a relevant upload condition setting item subjected to use restriction in a change-disabled state such that its value cannot be changed from its initial value.

<<Use Phase>>

Figure 9:
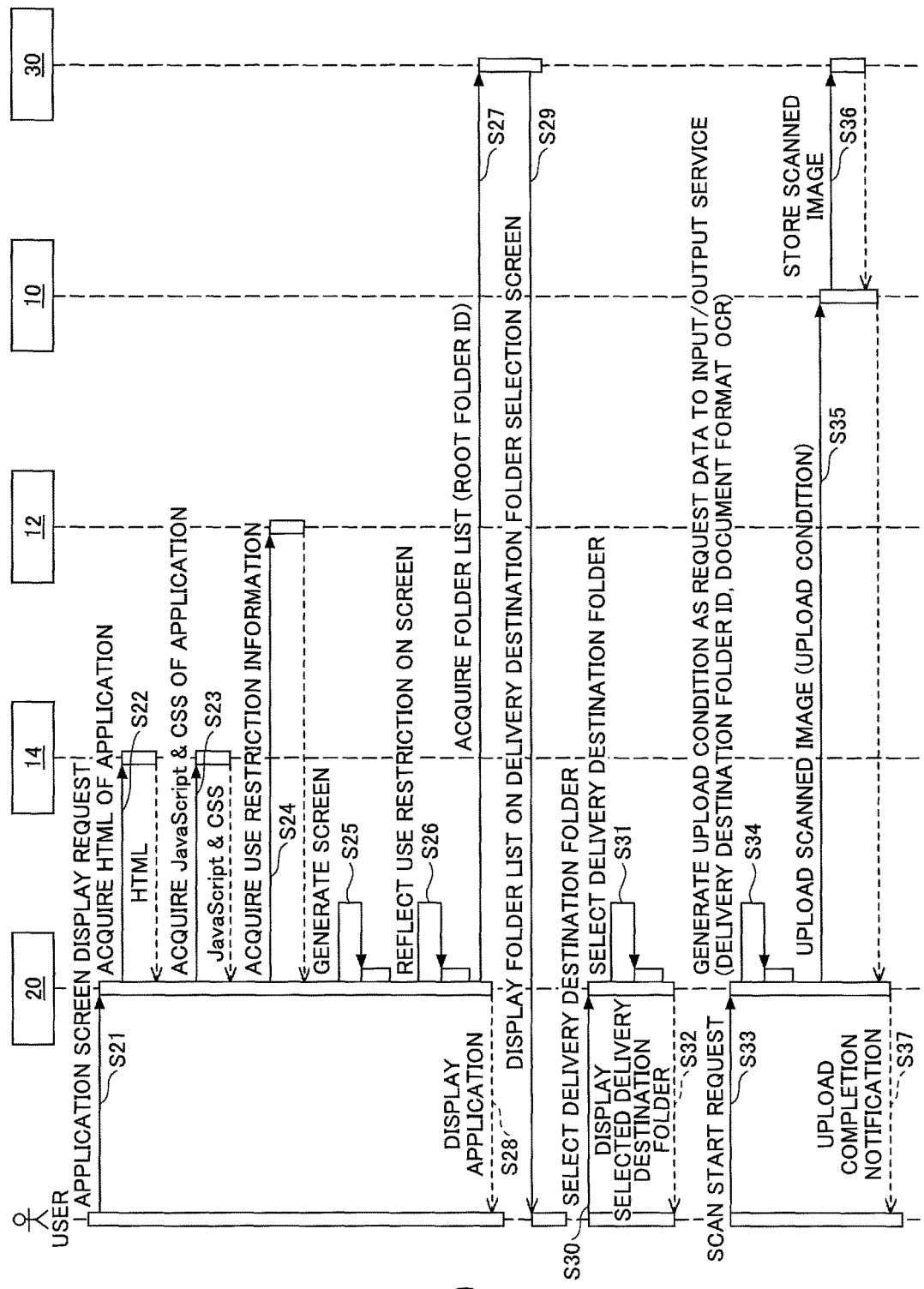
FIG. 9 is a sequence chart illustrating example process operations executed in a use phase according to an embodiment of the present invention.

FIG. 9 is a sequence chart illustrating example process operation executed in a use phase. FIG. 9 illustrates an example process sequence in which a user uses a scan delivery service.

In step S21, the user operates the MFP 20 to designate one MFP application from an MFP application list and make a display request to have a device cooperation service screen of the designated MFP application displayed, for example.

In step S22, the application acquisition unit 228 of the MFP 20 acquires HTML data of the MFP application designated by the user from the content providing service apparatus 14. In step S23, the application acquisition unit 228 acquires CSS data and JavaScript data of the MFP application designated by the user from the content providing service apparatus 14.

By executing the acquired CSS data and JavaScript data of the MFP application, the MFP 20 may be able to use the use restriction information acquisition unit 232, the delivery destination list acquisition unit 234, the request data generation unit 236, the setting reflection unit 238, and the use restriction unit 240.

Then, in step S24, the use restriction information acquisition unit 232 of the MFP 20 acquires use restriction information registered in association with the designated MFP application from the use restriction information generating service apparatus 12 by designating identification information (e.g., application ID) that is capable of uniquely identifying the relevant use restriction information as described above with reference to FIGS. 14-15B. Note that in some embodiments, the MFP 20 may acquire the use restriction information via the input/output service apparatus 10, for example.

Then, in step S25, the application execution unit 230 causes the screen rendering unit 222 to generate the device cooperation service screen of the MFP application. Note that the screen rendering unit 222 generates the device cooperation service screen of the MFP application based on the initial display screen specified in the common settings set up via the use restriction setting screen as illustrated in FIG. 8, for example. In step S26, the use restriction unit 240 interprets the use restriction information acquired in step S24, and reflects the use restriction information on the device cooperation service screen of the MFP application by displaying a relevant setting item subjected to use restriction in a change-disabled state such that its value cannot be changed from its initial value.

Then, in step S27, the delivery destination list acquisition unit 234 designates a root folder ID and sends a folder list acquisition request to the external storage system 30 to acquire a folder list. Note that in step S28, the screen rendering unit 222 of the MFP 20 displays the device cooperation service screen of the MFP application when generation of the device cooperation service screen is completed.

In step S29, the MFP 20 acquires the folder list from the external storage system 30. The screen rendering unit 222 of the MFP 20 displays the folder list acquired from the external storage system 30 in a folder selection screen as illustrated in FIG. 10, for example.

Figure 10:
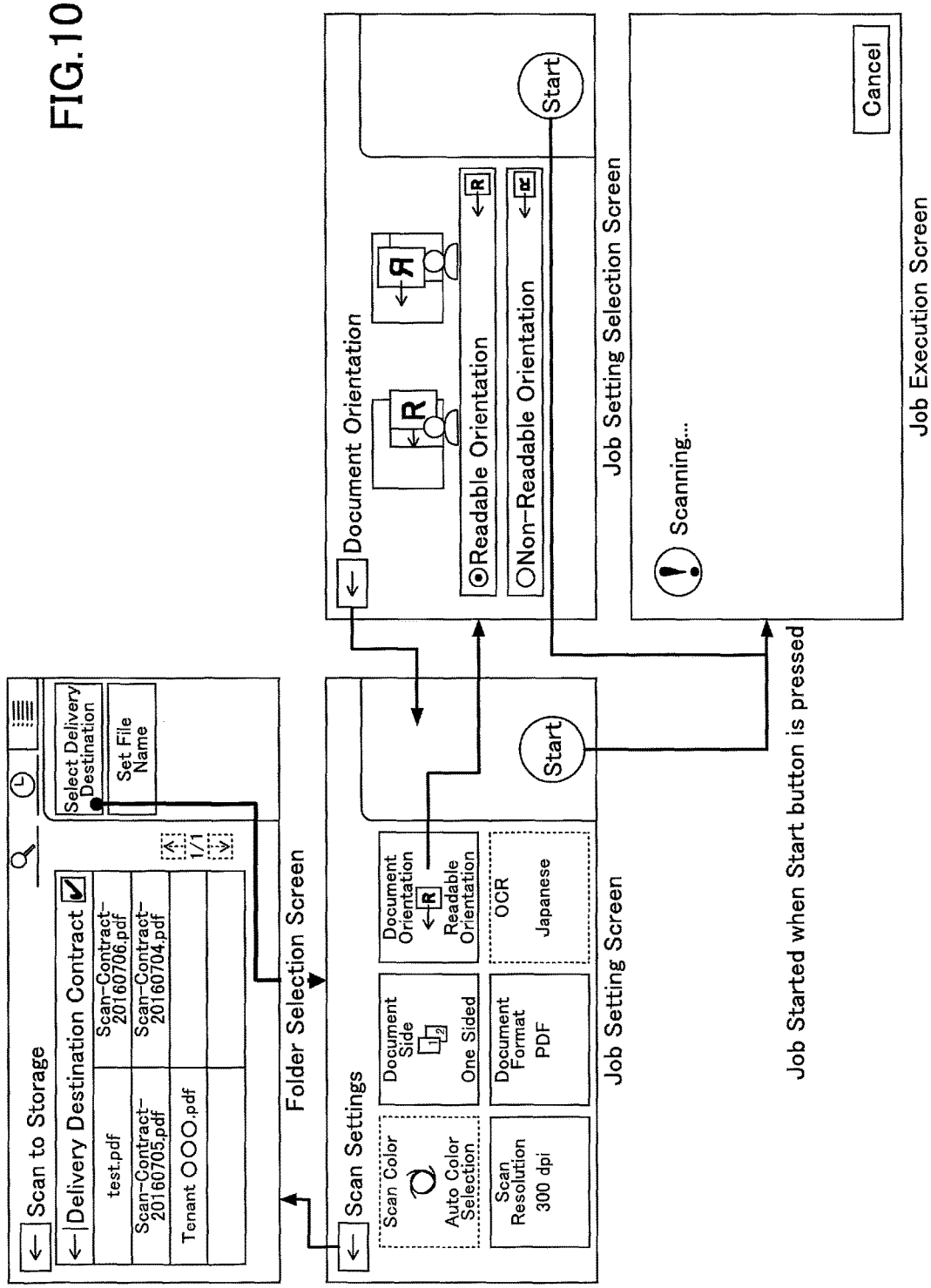
FIG. 10 is a diagram illustrating example screen transitions of a multifunction peripheral application according to an embodiment of the present invention.

FIG. 10 is a diagram illustrating example screen transitions of the device cooperation service screen of the MFP application. A folder list acquired from the external storage system 30 is displayed in the folder selection screen of FIG. 10. The user can select a delivery destination folder from the folder list via the folder selection screen of FIG. 10.

When a "Select Delivery Destination" button displayed in the folder selection screen is pressed, the screen of the MFP 20 transitions from the folder selection screen to a job setting screen as illustrated in FIG. 10. The job setting screen is a screen for enabling the user to confirm job settings. Note that details of the job setting screen will be described below.

When a certain job setting item is selected from the job setting screen, the MFP 20 displays a job setting selection screen as illustrated in FIG. 10. The job setting selection screen is a screen for accepting a job setting change from the user. The job setting selection screen of FIG. 10 represents an example in which the user can choose between the setting values "readable orientation" and "non-readable orientation" for the job setting item "document orientation".

Further, start buttons are included in the job setting screen and the job setting selection screen of FIG. 10. When the start button is pressed, the MFP 20 displays a job execution screen as illustrated in FIG. 10 and starts the relevant job.

Referring back to FIG. 9, in step S30, the user selects the delivery destination folder from the folder list displayed in the folder selection screen. Then, in step S31, the screen rendering unit 222 of the MFP 20 determines the selected status of the delivery destination folder selected by the user. Note that in some embodiments, the delivery destination folder may be set up in advance, for example. In step S32, the MFP 20 changes the display of the delivery destination folder selected by the user in the folder selection screen to indicate its selected status.

Then, in step S33, the user presses the start button and requests the MFP 20 to start a scan process. The scan execution unit 224 of the MFP 20 causes the scanner 606 to perform scan operations. In step S34, the request data generation unit 236 of the MFP 20 generates request data to be sent to the input/output service apparatus 10 including an upload condition that designates a delivery destination folder ID of the delivery destination folder, a document format process setting value, and an OCR process setting value, for example.

Referring back to FIG. 9, in step S35, the upload request unit 226 of the MFP 20 sends an upload request to the input/output service apparatus 10 for uploading scanned image data that has been acquired by the scanner 606 in step S33. Note that the upload condition included in the request data generated in step S34 is used in requesting the input/output service apparatus 10 to upload the scanned image data in step S35. The upload condition may have a configuration as illustrated in FIG. 11, for example.

FIG. 11 is a diagram illustrating an example configuration of an upload condition included in a request to an input/output service. The upload condition is information for delivering scanned image data to the external storage system 30. For example, the upload condition in the request to the input/output service illustrated in FIG. 11 includes a URL of the input/output service, a request header, and a request body. Note that uploading the scanned image data may be an asynchronous process, for example.

In step S36, the input/output service apparatus 10 stores the scanned image data in the external storage system 30 based on the request data from the MFP 20. After storage of the scanned image data in the external storage system 30 is completed, the input/output service apparatus 10 notifies the MFP 20 that the uploading process has been completed.

Note that in the case where the request data from the MFP 20 includes a designation of one or more input/output service processes, such as a document format process and/or an OCR process, to be executed by the input/output service apparatus 10, processed data resulting from executing the designated input/output service processes on the scanned image data is stored in the external storage system 30.

Figure 12:
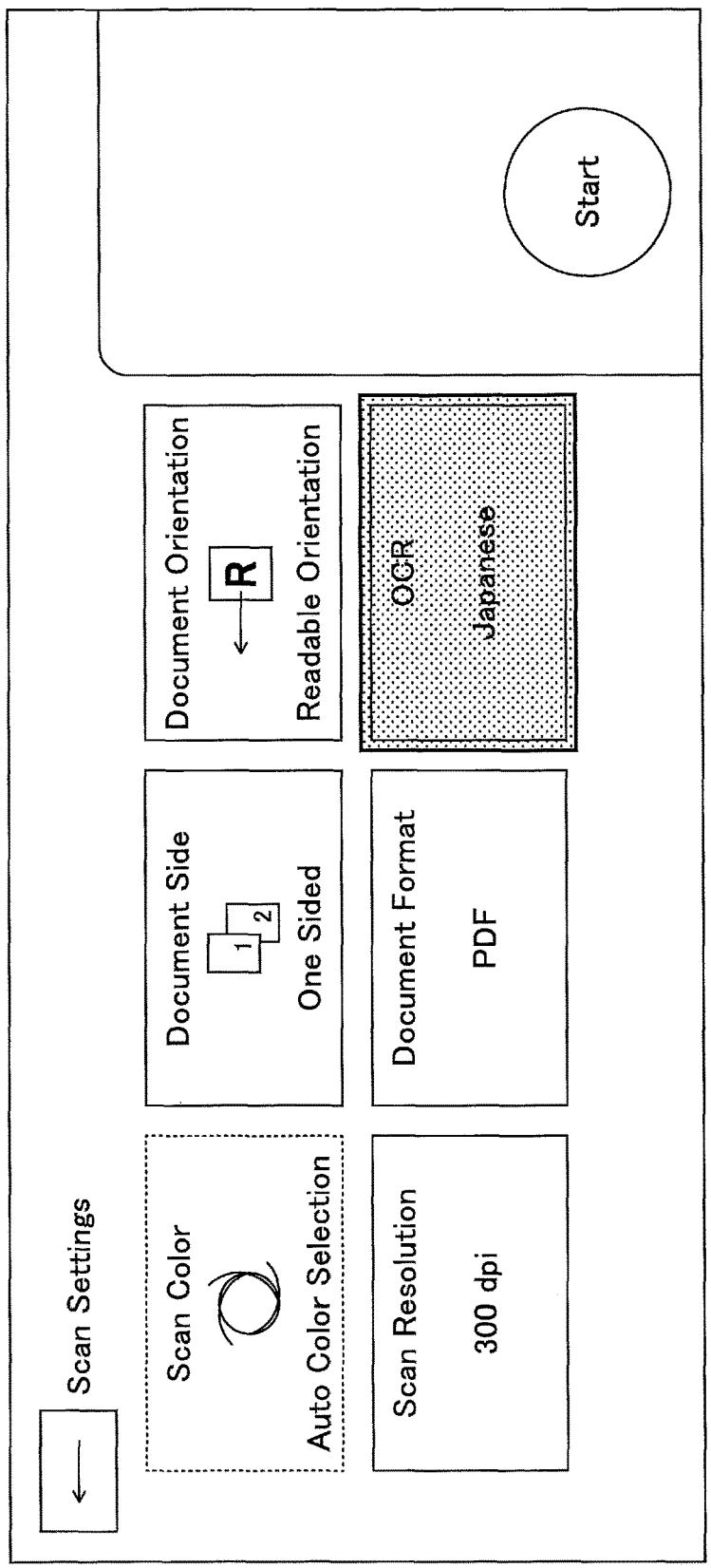
FIG. 12 is a diagram illustrating an example of a job setting screen.

FIG. 12 is a diagram illustrating an example of a job setting screen. The job setting screen of FIG. 12 displays a value of a setting item subjected to use restriction in a change-disabled state so that the value of the setting item cannot be changed by a user. In the example of FIG. 12, the value "auto color selection" of the setting item "scan color" and the value "Japanese" of the setting item "OCR" are displayed in change-disabled states so that these job setting values cannot be changed by a user. Also, in FIG. 12, the setting items "document side", "document orientation", "scan resolution", and "document format" are displayed in change-enabled states so that the values of these job setting items can be changed by a user.

The setting items "scan color", "document side", "document orientation", and "scan resolution" may be referred to as scan conditions. The scan condition settings are for specifying scan process instructions to the MFP 20 for executing a scan process (input/output device process). The administrator can specify an initial value of a scan condition on which a use restriction is to be imposed and designate the scan condition as a change-disabled scan condition.

The setting items "document format" and "OCR" are settings relating to the functions of the input/output service, and these settings are for specifying the document format of a document format process and the language of an OCR process to be executed by the input/output service apparatus 10. Example values that may be set up for the setting item "OCR" include "Japanese", "English", and "OFF (information indicating that the OCR function is not used)". In the example job setting screen of FIG. 12, the setting item "OCR" is set up so that the OCR function is implemented in Japanese and the language of the OCR process is fixed to the value "Japanese".

The job setting screen of FIG. 12 may be displayed based on use restriction information with specific content as illustrated in FIG. 13, for example. FIG. 13 is a diagram illustrating an example of specific content included in use restriction information. Note that the content of the use restriction information of FIG. 13 is represented in the JSON format.

According to an aspect of the present embodiment, a restriction may be imposed on the value of a job setting to be designated by a user via a job setting screen based on use restriction information generated by the use restriction information generating service apparatus 12, which is different from the MFP application. In this way, an administrator can restrict a user's ability to use a certain parameter for designating an upload condition via a job setting screen.

Note that in the above-described embodiment, an MFP application that provides a scan delivery service has been described as an example. However, aspects of the present invention may also be applied to an MFP application that provides a download print service, for example.

Although the present invention has been described above with reference to certain illustrative embodiments, the present invention is not limited to these embodiments, and numerous variations and modifications may be made without departing from the scope of the present invention.

What is claimed is:

1. An input/output device that provides a device cooperation service and that is connected to an input/output service apparatus that provides an input/output service to a computer system that provides a storage service and to a job setting restriction information generating service apparatus via a network, the input/output device comprising:
   a memory storing a program; and
   a processor configured to execute the program to implement processes of
      acquiring job setting restriction information from the job setting restriction information generating service apparatus, the job setting restriction information being used for restricting selection of a job setting included in a request to the input/output service from the input/output device to permitted job settings; and
      restricting selection of the setting in the request to the input/output service from the input/output device by reflecting the acquired job setting restriction information on a device cooperation service screen for enabling a user to select from among the permitted job settings to be included in the request, wherein
         the job setting restriction information includes predetermined values associated with the permitted job settings relating to an input/output device process and an input output service process, and information indicating whether the predetermined values can be changed.

2. The input/output device according to claim 1, wherein the processor further implements processes of
   accepting a selection of the device cooperation service; and
   acquiring the job setting restriction information that is associated with the selected device cooperation service from a job setting restriction information storage unit provided in the job setting restriction information generating service apparatus, wherein
      the job setting restriction information storage unit stores the job setting restriction information in association with the device cooperation service.

3. The input/output device according to claim 1, wherein
   the job setting restriction information includes information indicating that a value of a request job setting among the request job settings relating to the input/output device process and the input/output service process cannot be changed; and
   the processor displays the value of the request job setting on the device cooperation service screen in a change-disabled state.

4. The input/output device according to claim 1, wherein
   the device cooperation service is a service for delivering scanned image data acquired by the input/output device to the storage service corresponding to a delivery destination.

5. A non-transitory computer-readable medium storing a program to be executed by an input/output device that provides a device cooperation service and that is connected to an input/output service apparatus that provides an input/output service to a computer system that provides a storage service and to a job setting restriction information generating service apparatus via a network, the program, when executed, causing the input/output device to implement processes of
   acquiring job setting restriction information from the job setting restriction information generating service apparatus, the job setting restriction information being used for restricting selection of a job setting included in a request to the input/output service from the input/output device to permitted job settings; and
   restricting selection of the job setting in the request to the input/output service from the input/output device by reflecting the acquired job setting restriction information on a device cooperation service screen for enabling a user to select from among the permitted job settings to be included in the request, wherein the job setting restriction information includes predetermined values associated with the permitted job settings relating to an input/output device process and an input output service process, and information indicating whether the predetermined values can be changed.

6. An information processing system that provides a device cooperation service and includes an input/output device, an input/output service apparatus that provides an input/output service, a computer system that provides a storage service, and a job setting restriction information generating service apparatus; the input output device, the input/output service apparatus, the computer system, and the job setting restriction information generating service apparatus being connected to each other via a network, wherein the information processing system comprises:

a memory storing a program; and a processor configured to execute the program to implement processes of acquiring job setting restriction information from the job setting restriction information generating service apparatus, the job setting restriction information being used for restricting selection of a job setting included in a request to the input/output service from the input/output device to permitted job settings; and restricting selection of the job setting in the request to the input/output service from the input/output device by reflecting the acquired job setting restriction information on a device cooperation service screen for enabling a user to select from among the permitted job settings to be included in the request, wherein the job setting restriction information includes predetermined values associated with the permitted job settings relating to an input/output device process and an input output service process, and information indicating whether the predetermined values can be changed.

7. The information processing system according to claim 6, wherein the use restriction information generating service apparatus is configured to cause a terminal apparatus operated by an administrator to display a job setting restriction setting screen for accepting a job setting restriction information registration, generate the job setting restriction information based on the job setting restriction information registration accepted via the job setting restriction setting screen, and store the generated job setting restriction information in a job setting restriction information storage unit.

* * * * *